US009591618B2

(12) United States Patent
Shi et al.

(10) Patent No.: US 9,591,618 B2
(45) Date of Patent: Mar. 7, 2017

(54) TTI SWITCHING

(71) Applicant: Telefonaktiebolaget L M Ericsson (publ), Stockholm (SE)

(72) Inventors: Nianshan Shi, Järfälla (SE); Alessandro Caverni, Stockholm (SE); Billy Hogan, Sollentuna (SE); Waikwok Kwong, Solna (SE); Jose Luis Pradas, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/382,254

(22) PCT Filed: Apr. 10, 2014

(86) PCT No.: PCT/SE2014/050441
§ 371 (c)(1),
(2) Date: Aug. 29, 2014

(87) PCT Pub. No.: WO2014/189429
PCT Pub. Date: Nov. 27, 2014

(65) Prior Publication Data
US 2015/0289243 A1    Oct. 8, 2015

Related U.S. Application Data

(60) Provisional application No. 61/825,751, filed on May 21, 2013.

(51) Int. Cl.
*H04W 72/04* (2009.01)
*H04W 28/16* (2009.01)
(Continued)

(52) U.S. Cl.
CPC ....... *H04W 72/0406* (2013.01); *H04W 28/16* (2013.01); *H04W 72/0446* (2013.01); *H04W 72/14* (2013.01); *H04W 88/12* (2013.01)

(58) Field of Classification Search
CPC ......... H04W 72/0406; H04W 72/0446; H04W 88/12; H04W 28/16
See application file for complete search history.

(56) References Cited

U.S. PATENT DOCUMENTS

2006/0056355 A1* 3/2006 Love ................. H04W 74/0866
370/332
2007/0104150 A1* 5/2007 Fernandez-Corbaton H04B 1/7107
370/335
(Continued)

FOREIGN PATENT DOCUMENTS

WO    2011143674 A1    11/2011
WO    2013020651 A1    2/2013

OTHER PUBLICATIONS

Unknown, Author, "2ms/10ms TTI Switching", 3GPP TSG-RAN WG2#46, R2-050566, Lucent Technologies, Scottsdale, Arizona, USA, Feb. 14-18, 2005, pp. 1-3.
(Continued)

*Primary Examiner* — Ajay Cattungal
(74) *Attorney, Agent, or Firm* — Murphy, Bilak & Homiller, PLLC

(57) ABSTRACT

A radio network controller, RNC, keeps control of how many users to configure on a first transmission time interval, TTI, and how many to configure on a second TTI. For example, a method is performed by the RNC, for configuring at least one radio bearer between a radio base station, RBS, and wireless communication devices. The method comprises sending, from the RNC to the RBS, radio bearer configuration information for controlling a distribution between a first number of wireless communication devices and a second number of wireless communication devices where the first number of wireless communication devices are operating a radio bearer using a first TTI, and the second
(Continued)

number of wireless communication devices are operating a radio bearer using a second TTI.

17 Claims, 5 Drawing Sheets

(51) Int. Cl.
*H04W 72/14* (2009.01)
*H04W 88/12* (2009.01)

(56) References Cited

U.S. PATENT DOCUMENTS

| | | | |
|---|---|---|---|
| 2009/0034474 A1 | 2/2009 | Yavuz et al. | |
| 2011/0116563 A1* | 5/2011 | Vitthaladevuni | H04L 1/0001 375/260 |
| 2012/0250644 A1* | 10/2012 | Sambhwani | H04W 72/0413 370/329 |
| 2012/0300636 A1* | 11/2012 | Wang | H04L 47/14 370/235 |
| 2013/0128780 A1* | 5/2013 | Terry | H04L 1/0003 370/280 |
| 2014/0328260 A1* | 11/2014 | Papasakellariou | H04W 72/1289 370/329 |

OTHER PUBLICATIONS

Unknown, Author, "Coverage improvements for Further EUL Enhancements", 3GPP TSG-RAN WG2 #82 R2-131685 Fukuoka, Japan Source: Ericsson, ST-Ericsson, May 20-24, 2013, 1-4.

* cited by examiner

TTI SWITCHING

TECHNICAL FIELD

Embodiments herein relate to a wireless communication system, and more specifically to managing transmission time interval switching in a wireless communication system.

BACKGROUND

Many wireless communication systems now support multiple kinds of services, including for instance circuit switched voice services, packet data services, high data rate services, etc. These different services have very different characteristics. Moreover, different applications using the same general service may nonetheless impose different demands on that service. For instance, an internet browsing application may be supported by a packet data service that has a variable delay and throughput, while a multimedia streaming application may be supported by a packet data service having a relatively constant average throughput and low delay.

A wireless communication system supports these varying services through the use of radio bearers. A radio bearer supports the transfer of user data over a radio connection between a wireless communication device and a base station with defined data transfer characteristics (e.g., with a defined quality of service, QoS). Different radio bearers are configured to provide different defined transfer characteristics.

Under some circumstances, though, the configuration or state of a given radio bearer may need to be changed, e.g., in order to optimize the radio bearer for the current requirements of the wireless communication device. A change in the configuration or state of a radio bearer involves, as non-limiting examples in a context where the system is a High Speed Packet Access (HSPA) system, adding or removing the radio bearer, moving the radio bearer between a dedicated physical channel (DPCH) and enhanced uplink (EUL)/high speed (HS), changing the spreading factor and/or bit rate, and/or adding or removing connection capabilities (e.g., EUL 2 ms/10 ms transmission time interval (TTI), Dual Cell or multi-carrier, 64 quadrature amplitude modulation (64QAM), multiple-input multiple-output (MIMO), continuous packet connectivity (CPC), downlink (DL) enhanced layer 2 (L2), uplink (UL) improved L2).

Consider the specific example of a radio bearer configuration change relating to a change in the TTI of a radio bearer (i.e. a TTI switch). The TTI is a radio bearer parameter that defines the interval of time in which a transmission occurs over the air interface. In some systems, for instance, a set of one or more so-called transport blocks are fed from a medium access control (MAC) layer to the physical layer, and the TTI is the time it takes to transmit that set of one or more transport blocks over the air interface.

Regardless, a longer TTI (e.g., 10 ms or above) proves more robust in the face of poor channel conditions. On the other hand, a shorter TTI (e.g., 2 ms) reduces latency, which is required to provide good end-user experience when supporting mobile broadband services. Because of this, it is desirable to use a shorter TTI over as wide an area as possible. However, at least in current third generation (3G) networks, a substantial number of large macro cells still exist. With a macro cell being so large, it generally proves challenging for the cell to support a TTI as short as 2 ms over its entire coverage area. In such environments, it may be necessary to fall back to a longer TTI, e.g., 10 ms, when a wireless communication device approaches the cell boundary. This however requires that a radio bearer configuration change be triggered when the device approaches the cell boundary, and that the change be applied.

In the current third generation partnership project (3GPP) specifications (i.e. up to Rel-11, meaning Release-11), when enhanced dedicated channel (E-DCH) is used in CELL_DCH state, it is the radio network controller (RNC) that configures if a user should operate on 2 ms TTI or 10 ms TTI. Here and in the following description, the concept of "user" is to be understood as being equivalent to "wireless communication device".

During the ongoing 3GPP Rel-12 (meaning Release-12) discussion, with particular regard to the Study Item "Study on Further EUL Enhancements", several methods are being evaluated, aimed at increasing the EUL coverage especially for 2 ms TTI operations.

SUMMARY

In order to at least mitigate drawbacks as discussed above, there is provided in different embodiments a method performed by a RNC, a method performed by a radio base station (RBS) and corresponding RNC, RBS, computer program and carrier.

However, before summarizing these embodiments, it is to be noted that in U.S. 61/758,622, filed Jan. 30, 2013, some enhancements were described, based on improved measurements and faster and more robust switching. Regarding the latter, one possible improvement relies on a switch decision (for instance from 2 ms to 10 ms TTI) taken autonomously by the NodeB (noting that NodeB is an example of a RBS), allowing for a faster reconfiguration of the TTI. Unlike the existing reconfiguration procedures for EUL TTI switch, it would hence not be the RNC to take the decision but the NodeB.

In the current 3GPP specification, since the TTI switch decision is taken by the RNC, the RNC knows in advance if the data being sent on E-DCH resource by the user equipment (UE, noting that UE is an example of a wireless communication device) is transmitted on 2 ms or 10 ms TTI and also knows how many users are transmitting on 2 ms or 10 ms TTI.

The RNC needs this information for different purposes:
1. The characteristics and performance requirement for the 10 ms and 2 ms TTI are quite different due to the difference in TTI length. The RNC, therefore, needs to know in advance whether the UE will switch the TTI in order to correctly configure or reconfigure the user plane on the interface between the NodeB and RNC so as to be able to transfer data to the upper layer in a consistent way.
2. The RNC may use the information to estimate the relative utilization between the two TTIs and determine, by means for instance of admission control policies, the maximum number of 2 ms TTI users and the maximum number of 10 ms TTI users admitted to utilize E-DCH resources at the same time. This allows the RNC to dynamically manage the resources needed by E-DCH traffic in the cell.

With the introduction of a NodeB autonomous decision as proposed in U.S. 61/758,622, the RNC would still be able to keep track of the number of users that have undergone the TTI reconfiguration, but it would no longer be able to control how many users to put on the 2 ms and how many on the 10 ms TTI.

Embodiments herein provide means for the RNC to keep control of how many users to configure on 2 ms TTI and how many on 10 ms TTI.

In other words, in a first aspect there is provided a method, performed by a radio network controller, RNC, for configuring at least one radio bearer between a radio base station, RBS, and wireless communication devices. The method comprises sending, from the RNC to the RBS, radio bearer configuration information for controlling a distribution between a first number of wireless communication devices and a second number of wireless communication devices where the first number of wireless communication devices are operating a radio bearer using a first TTI, and the second number of wireless communication devices are operating a radio bearer using a second TTI.

In a second aspect, there is provided a method, performed by a radio base station, RBS, for configuring at least one radio bearer between the RBS and wireless communication devices. The method comprises receiving, from a radio network controller, RNC, radio bearer configuration information. The radio bearer configuration information comprises information for controlling a distribution between a first number of wireless communication devices and a second number of wireless communication devices, where the first number of wireless communication devices are operating a radio bearer using a first TTI, and where the second number of wireless communication devices are operating a radio bearer using a second TTI. Using the received radio bearer configuration information, control is then performed of switching of the wireless communication devices from operating using the first transmission time interval, TTI, to operating using the second TTI.

In further aspects, a corresponding RNC, a corresponding RBS and computer programs are provided, as will be described in detail below.

Also provided are additional means for the RNC and the NodeB to be synchronized regarding the amount of 2 ms and 10 ms TTI resources that can be autonomously allocated by the serving NodeB.

These high level mechanisms can be used for this purpose as will be summarized below. It is to be noted that, in the following, reference will be made to a controlling RNC (CRNC), a serving RNC (SRNC) as well as to a RNC. As the skilled person will realize, a CRNC is a RNC that is responsible for an overall control of resources of access points (such as a NodeB) in a radio access network (RAN) and a SRNC is a RNC that handles a connection to one wireless communication device (i.e. it is the entity that terminates the MAC-d protocol). In many typical realizations of RANs, the functionalities of CRNC and SRNC are co-located. Consequently, in the present context, a RNC can be seen as a combined CRNC/SRNC.

In a first embodiment, CRNC configures the maximum number of serving users per cell for each TTI (e.g. either 2 ms or 10 ms) that the NodeB can allocate (serving users are users having this cell as their serving cell).

A further embodiment is built on top of embodiment 1, where:
1. CRNC configures the maximum number of serving users per cell for each TTI that the NodeB can allocate (serving users are users having this cell as their serving cell).
2. For the NodeB autonomous TTI switching decision, NodeB allocates the new TTI configuration (either 2 ms or 10 ms) taking into account the limitations configured by the CRNC.
3. NodeB indicates to the CRNC/SRNC about the TTI switching decision.
4. For better performance, NodeB recommends new maximum number allocations for each TTI Type to the CRNC.

In a further embodiment, a NodeB is configured to communicate with a UE. The NodeB receives a maximum TTI allocation from an RNC. The NodeB stores the maximum TTI allocation. A UE TTI switch is triggered. The NodeB receives a TTI switch trigger from the UE. The NodeB determines the TTI to be used by the UE, considering the maximum TTI allocation. The NodeB transmits the TTI switch to the UE. The NodeB transmits the TTI switch to the RNC, such that the RNC can maintain a TTI record.

In a further embodiment, a UE is served by a NodeB. The NodeB is connected to an RNC. The UE transmits a TTI switch trigger to the NodeB. The NodeB may determine the TTI of the UE based on a maximum TTI allocation received from the RNC. The UE receives a TTI switch execution from the NodeB, based on a maximum TTI allocation received from the RNC.

DETAILED DESCRIPTION

Figure 1:
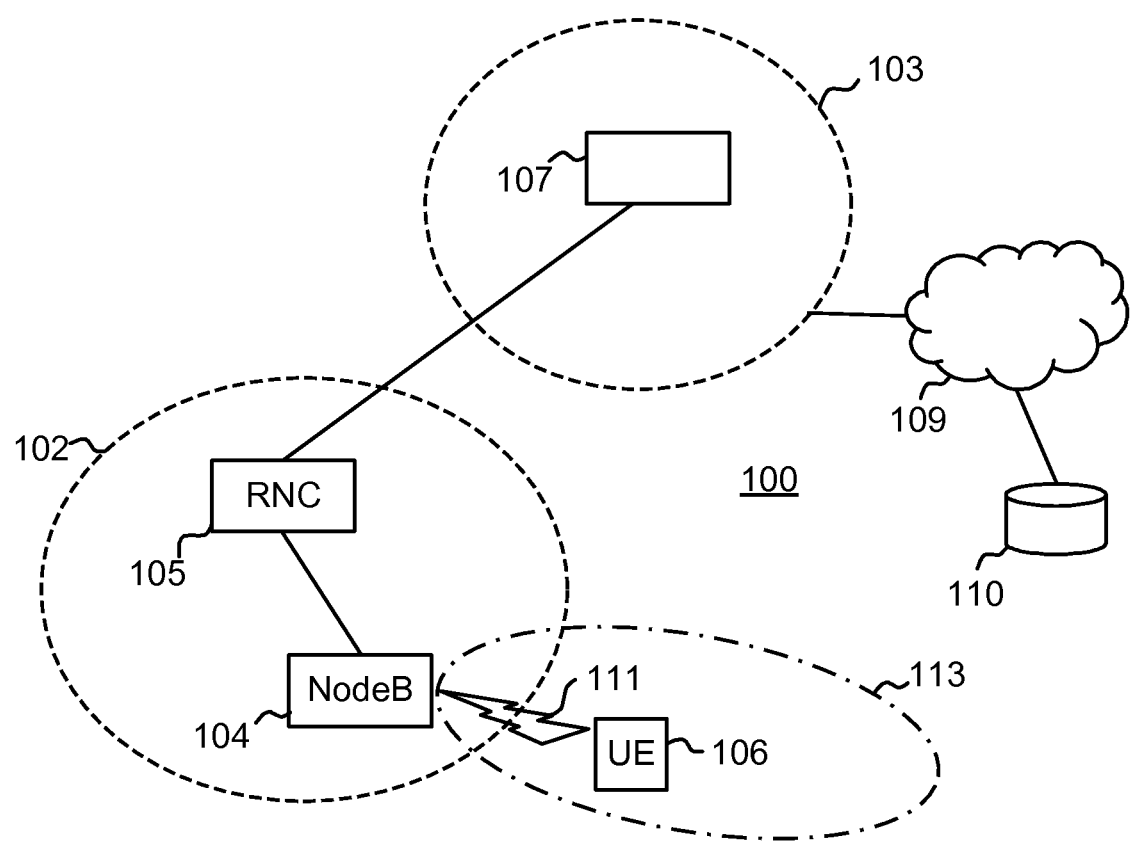
FIG. 1 is a schematic block diagram of a wireless communication system.

FIG. 1 illustrates schematically an exemplifying wireless communications system 100 in which embodiments herein may be implemented. The wireless communications system 100 may be any 3GPP wireless communication system, such as a Universal Mobile Telecommunication System (UMTS) Wideband Code Division Multiple Access (WCDMA) network, a Global System for Mobile communication (GSM), or the like. The wireless communication system 100 may even be an evolution of any one of the aforementioned systems or a combination thereof.

The wireless communication system 100 may comprise a number of different nodes distributed in a radio access network 102 and a core network 103.

Nodes in the radio access network 102 may be denoted "radio network node" and, for example, refer to a Base Station (BS), a Base Transceiver Station (BTS), a Radio Base Station (RBS), a Remote Radio Unit (RRU), an access point, a NodeB in 3G networks, evolved NodeB (eNodeB or eNB) in Long Term Evolution (LTE), networks, or the like. In UMTS Terrestrial Radio Access Network (UTRAN) networks, a node may also be a RNC. Furthermore, in Global System for Mobile Communications, GSM, EDGE Radio Access Network, GERAN, where EDGE is short for Enhanced Data rates for GSM Evolution, the term "radio network node" may also refer to a Base Station Controller (BSC).

As FIG. 1 shows, a RNC 105 may be connected to other nodes in the system, exemplified here by a NodeB 104 in the radio access network 102 and connected to an entity 107, such as any entity in the core network 103 and further nodes, such as node 110 in another network 109. It is to be noted, however, that any details regarding communication with such entities is outside the scope of the present disclosure.

A number of wireless communication devices may be operating in the system 100. One such wireless communication device 106 is shown being in connection via a radio interface 111 with a NodeB 104 in the radio access network 102. The wireless communication device 106, and typically many other wireless communication devices (not shown), are located in a cell 113 that is under the control of the NodeB 104. As used herein, the term "wireless communication device" may refer to a user equipment, UE, a subscriber unit, mobile phone, a cellular phone, a Personal Digital Assistant, PDA, equipped with radio communication capabilities, a smartphone, a laptop or personal computer, PC, equipped with an internal or external mobile broadband modem, a tablet PC with radio communication capabilities, a portable electronic radio communication device or the like. As will be described in some detail in the following, focus will be made on communication between a RNC, a NodeB and a UE.

Figure 2:
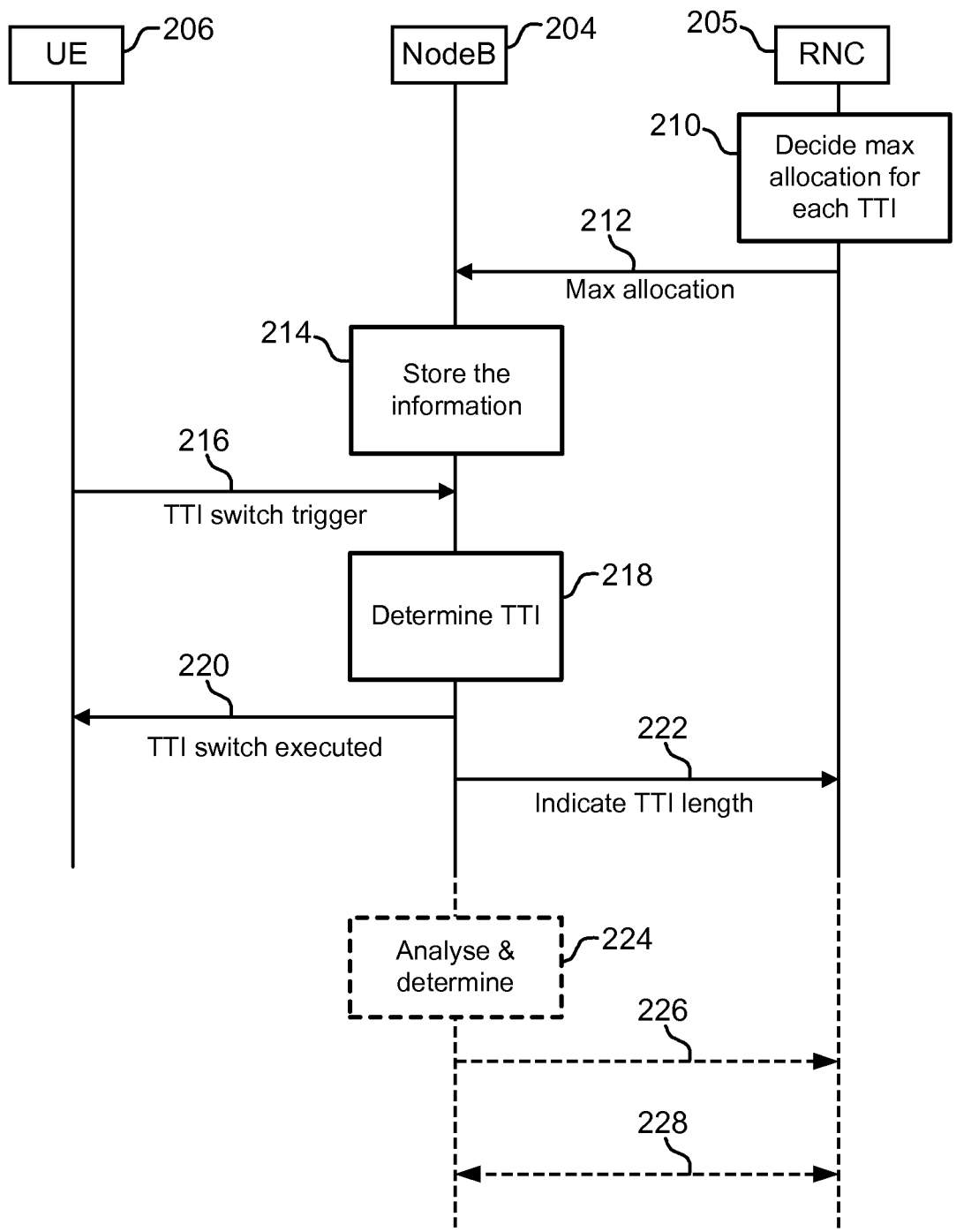
FIG. 2 is a combined flow chart and signaling diagram.
Figure 3:
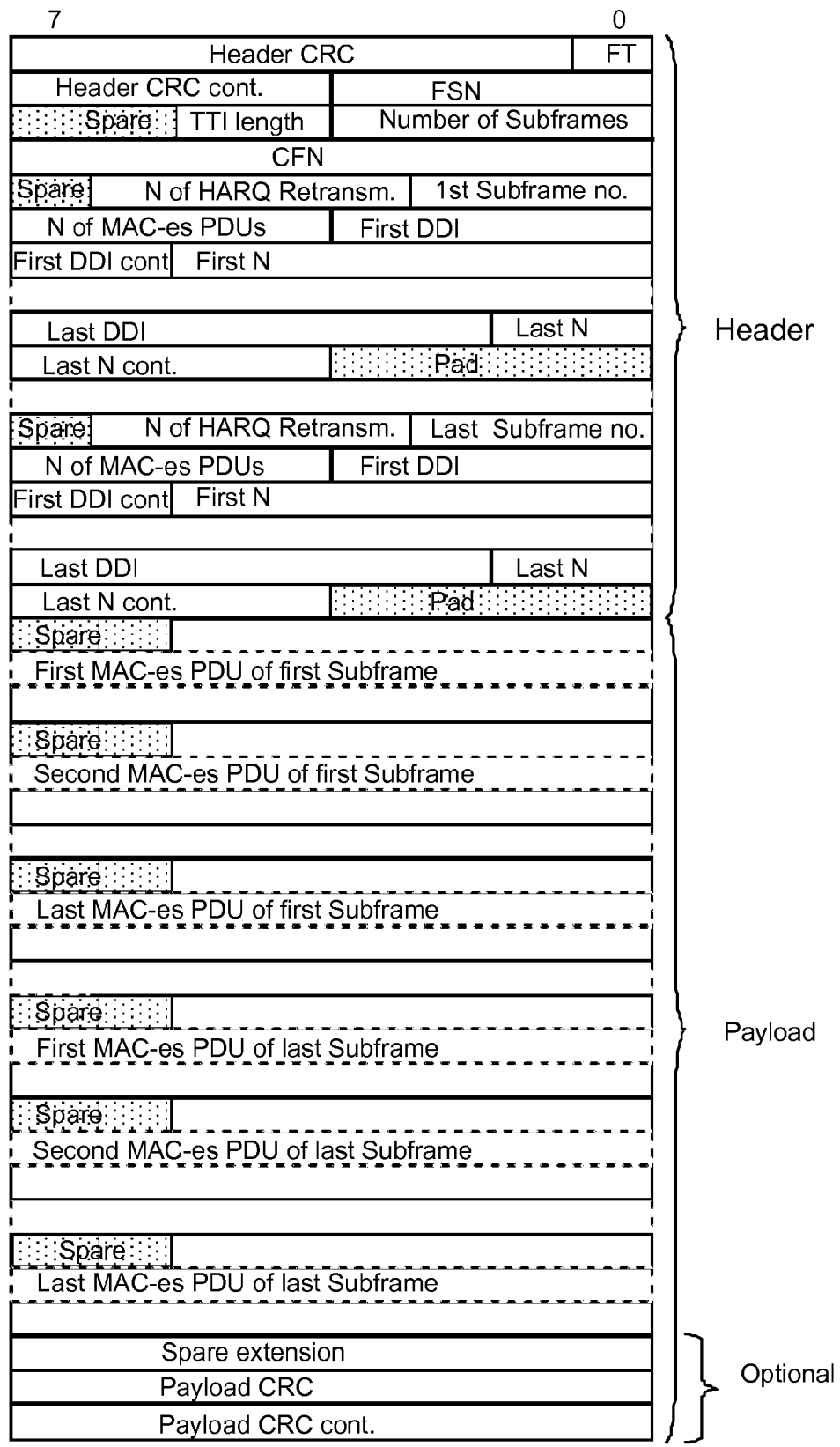
FIG. 3 illustrates contents of a data frame.

Turning now to FIGS. 2 to 3, embodiments of methods will be described in some detail, remembering that the term "user" is equivalent to "wireless communication device".

During the setup of E-DCH channels, the CRNC used to decide how the resource for each TTI configuration should be allocated. With NodeB autonomous TTI switching, the CRNC instead configures how many 2 ms and 10 ms TTI serving users the NodeB is allowed to setup and/or switch to (serving users are users having this cell as their serving cell).

Solution A.1:

A new NBAP (NodeB application part) message carrying the maximum user allocation information for each TTI type is sent from the CRNC to the NodeB. The information may be given as:

The maximum allocation of serving 2 ms TTI users (Radio links) per cell supported by this cell in the NodeB.

The maximum allocation of serving 10 ms TTI users (Radio Links) per cell supported by this cell in the NodeB.

The maximum 10 ms TTI allocation supported by NodeB if no 2 ms TTI serving user is switched (serving users are users having this cell as their serving cell).

The maximum number of serving users per cell for each TTI that can be allocated by the NodeB refers to all of the E-DCH serving users per TTI type per cell (without any distinction based on the Access Stratum Release).

Alternatively the maximum number of serving users per cell for each TTI that can be allocated by the NodeB refers to the Rel-12 users supporting the NodeB autonomous TTI switch.

Alternatively it refers to the Rel-12 serving users (without distinction on whether they support the new feature or not).

Additionally, the following options may also be used for the "maximum number of users":

a. The total number of E-DCH Radio Links (RL), i.e., serving and non-serving together, for 10 ms TTI, for 2 ms TTI, or with no distinction between the two TTI lengths.

b. To allow, the RNC to keep a certain quota for setting up new connections, an upper limit can be put on each of the number of RL's that have been autonomously switched to 10 ms and/or 2 ms but are still remaining in the NodeB.

The cell identification, for example Cell Id.

Any other quantities that may convey the same information. Other types of cell identity may be used to identify the cell.

Alternatively, an existing NBAP message (for example NBAP: PHYSICAL SHARED CHANNEL RECONFIGURATION REQUEST or CELL SETUP REQUEST) may be extended to include the above information.

The NodeB should store the above information and use it when taking the TTI switching decision so that the maximum limitation is not exceeded.

Solution A.2:

In addition to Solution A.1 outlined above, the NodeB should notify the CRNC/SRNC about the TTI switching decision. The existing Iub/Iur Frame Protocol can be extended to include the TTI length indication. Alternative, new or existing control Plane messages can be used to carry the information.

NodeB updates the available 2 ms TTI and 10 ms TTI limitation each time a user is switched/admitted/released.

CRNC may keep track of the number of different TTI users each time a user is switched/admitted/released.

Solution A.3:

In addition to solution A.1 and solution A.2, the NodeB may also suggest RNC to reconfigure the maximum number of TTI, for example when NodeB receives a certain amount of TTI switching trigger when the TTI limitation is reached or is about to be reached.

Note that Solution A.3 could be independent (no need to use Solution A.1 and/or Solution A.2).

This method is illustrated in FIG. 2 and table 1. In the example, NBAP of TS 25.433 (chapter 9.1.62) "PHYSICAL SHARED CHANNEL RECONFIGURATION REQUEST" is extended. A new information element (IE) group "TTI Switching Configuration" is introduced at the end of the table as TTI Amount Configuration, as in Table 1. Other IE carrying similar information can be defined, in other positions.

Solution B:

After the NodeB has executed the TTI switching, it has to inform the CRNC/SRNC about the actual TTI length used for the user data transmission.

The user plane protocol "Uplink for E-DCH" in 25.427 can be extended to carry the TTI length indication, as in FIG. 3.

FIG. 3 shows the definition of the user plane of TS 25.427 (chapter 9.1.89) E-DCH UL DATA FRAME FOR E-DCH TYPE 1. In the example of FIG. 3, a new IE "TTI Length" is introduced in the spare bits in the header (2 spare bits are used, 01: 2 ms TTI; 10: 10 ms TTI; 11: reserved). Other IE carrying similar information can be defined, in other positions. The similar change can apply for E-DCH UL DATA FRAME FOR E-DCH TYPE 2.

Alternatively, a new control plane message, a new or an existing user plane control frame can be used to carry this information.

Solution C:

It may be advantageous if the RNC and NodeB can synchronize that both have the same view on the number of radio links of serving type of each TTI handled in each node. Consistency checks can be added to also provide the information of the current number of radio links in use from the RNC to the RBS and vice versa. This can be done using existing messages or new NBAP messages as above. As the RNC is in control of the admission, the RBS should adapt to the RNC defined current number of users.

These method embodiments are further illustrated in FIG. 2. As FIG. 2 shows, a wireless communication device 206 (exemplified by an UE) is in connection with a RBS 204 (exemplified by a NodeB) and the NodeB 204 is in connection with a RNC 205, for example a situation as illustrated in FIG. 1. FIG. 2 shows a number of actions as follows.

Action 210

In this action, the RNC 205 decides the maximum allocation for each TTI. In more general terms, radio bearer configuration information is created for controlling a distribution between a first number of wireless communication devices and a second number of wireless communication devices, said first number of wireless communication devices operating a radio bearer using the first TTI, and said second number of wireless communication devices operating a radio bearer using the second TTI.

Action 212

The radio bearer configuration information is transmitted from the RNC 205 to the RBS/NodeB 204. As described above, NBAP can be used: new or existing control plan message (maximum 2 ms TTI allocation, maximum 10 ms TTI allocation, etc).

Action 214

The RBS/NodeB 204 stores the received information.

The received information is then used in the RBS/NodeB 204 to control switching of the wireless communication devices from operating using a first transmission time interval, TTI, to operating using a second TTI. This control may be performed, for example, by way of the following actions.

Action 216

The RBS/NodeB receives a TTI switch trigger from the wireless communication device/UE 206. In other words, a TTI switch is triggered.

Action 218

The RBS/NodeB 204 may perform the control, using the received radio bearer configuration information, of switching of the wireless communication device 206 from operating using a first transmission time interval, TTI, to operating using a second TTI comprises any one decision or both decisions of:

deciding that a wireless communication device 206 using the first TTI in a radio bearer is to be switched to using the second TTI,
  deciding that a wireless communication device 206 using the second TTI in a radio bearer is to be switched to using the first TTI.

For example, this may entail that the RBS/NodeB 204 determines if the UE should use 10 ms TTI or 2 ms TTI.

Action 220

The TTI switch is executed by sending an order to the wireless communication device/UE 206 in the form of, e.g., a HS-SCCH order.

Action 222

This action may entail, if the decision is made that the wireless communication device 206 using the first TTI in a radio bearer is to be switched to using the second TTI, sending, to the RNC 205, information that the wireless communication device using the first TTI in a radio bearer is to be switched to using the second TTI, if the decision is made that the wireless communication device using the second TTI in a radio bearer is to be switched to using the first TTI, sending, to the RNC 205, information that the wireless communication device using the second TTI in a radio bearer is to be switched to using the first TTI.

In the RNC 205, this includes receiving, from the RBS/NodeB 204, information for updating the radio bearer configuration information and updating the radio bearer configuration information based on the information received from the RBS/NodeB 204.

In some embodiments, the RBS/NodeB 204 may send, to the RNC 205, information regarding any of: information that the first TTI is used in a radio bearer, information that the second TTI is used in a radio bearer.

For example, in case Iub frame protocol (FP) is used: RBS/NodeB 204 indicates to CRNC the TTI length; if CRNC is not SRNC, Iur FP will be used to indicate to SRNC.

Action 224

The RBS/NodeB 204 may in some embodiments analyse a status of radio bearers, the status being in terms of TTI switch triggers received from wireless communication devices. A determination is made, based on the analysis of the status of radio bearers, of information for updating the radio bearer configuration information. In some embodiments the information for updating the radio bearer configuration information comprises values representing maximum numbers of wireless communication devices operating a radio bearer using the first and the second TTI.

Action 226

The determined information for updating the radio bearer configuration information may then be sent from the RBS/NodeB 204 to the RNC 205. The RNC 205 receives the information for updating the radio bearer configuration information and updates the radio bearer configuration information based on the information received from the RBS/NodeB 204.

Action 228

A synchronization between the RBS/NodeB 204 and the RNC 205 may entail exchanging information regarding the number of wireless communication devices operating a radio bearer using the first TTI and the second TTI, respectively.

As is evident from the above actions, the words NodeB and RBS are used interchangeably herein to describe a radio network base station. Moreover, as mentioned above, the radio bearer configuration information may in embodiments comprise any of:

at least one NodeB application part, NBAP, message,
  at least one Iub/Iur frame protocol message,
  at least one control plane message.

Furthermore, as mentioned above, the first TTI may be 2 milliseconds and the second TTI may be 10 milliseconds.

The words NodeB and RBS are used interchangeably herein to describe a radio network base station.

Embodiments of this invention allow both the NodeB and the RNC to be aligned with regard to admission control limitations concerning the number of E-DCH 2 ms and 10 ms TTI users.

Turning now to FIGS. 4 to 8, apparatus and computer program related embodiments will be described in some detail.

Figure 4:
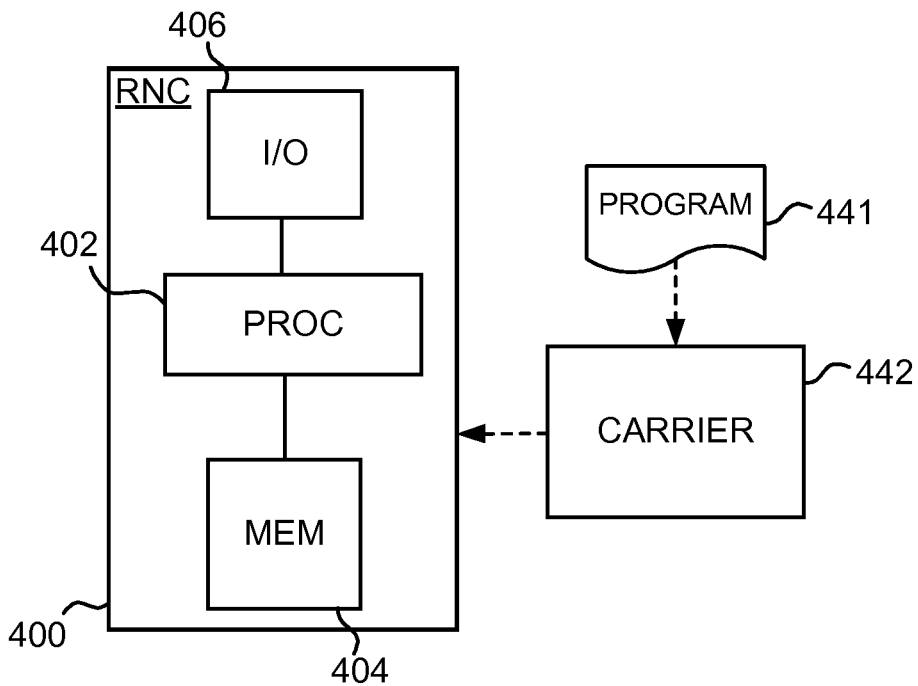
FIG. 4 is a schematic block diagram of a RNC.

FIG. 4 illustrates a RNC 400, which may be the RNC 105 as described above in connection with FIG. 1. The RNC 400 comprises input/output circuitry 406, a processor 402 and a memory 404. The memory 404 contains instructions executable by the processor 402 whereby the RNC 400 is operative to configure at least one radio bearer between a RBS (such as the NodeB 104 in FIG. 1, remembering that a NodeB is an example of a RBS as explained above) and wireless communication devices (such as the UE 106 in FIG. 1, remembering that a UE is an example of a wireless communication device) by:

sending, from the RNC 400 to the RBS, radio bearer configuration information for controlling a distribution between a first number of wireless communication devices and a second number of wireless communication devices, said first number of wireless communication devices operating a radio bearer using a first TTI, and said second number of wireless communication devices operating a radio bearer using a second TTI.

The instructions that are executable by the processor 402 may be software in the form of a computer program 441. The computer program 441 may be contained in or by a carrier 442, which may provide the computer program 441 to the memory 404 and processor 402. The carrier 442 may be in any suitable form including an electronic signal, an optical signal, a radio signal or a computer readable storage medium.

In some embodiments the first number of wireless communication devices and said second number of wireless communication devices are respective maximum numbers.

In some embodiments, the RNC 400 is operative to configure the radio bearers by:
  receiving, from the RBS, information regarding any of:
    a wireless communication device using the first TTI in a radio bearer is to be switched to using the second TTI,
    a wireless communication device using second TTI in a radio bearer is to be switched to using the first TTI.

In some embodiments, the RNC 400 is operative to configure the radio bearers by:
  receiving, from the RBS, information for updating the radio bearer configuration information,
  updating the radio bearer configuration information based on the information received from the RBS.

In some embodiments, the RNC 400 is operative to configure the radio bearers by:
  receiving, from the RBS, information regarding any of:
    information that the first TTI is used in a radio bearer,
    information that the second TTI is used in a radio bearer.

In some embodiments, the RNC 400 is operative to configure the radio bearers by:
  exchanging, with the RBS, information regarding the number of wireless communication devices operating a radio bearer using the first TTI and the second TTI, respectively.

In some embodiments, the RNC 400 is operative to configure the radio bearers by:
  sending at least one NodeB application part, NBAP, message,
  sending at least one Iub/Iur frame protocol message,
  sending at least one control plane message.

In some embodiments, the first TTI is 2 milliseconds and the second TTI is 10 milliseconds.

Figure 5:
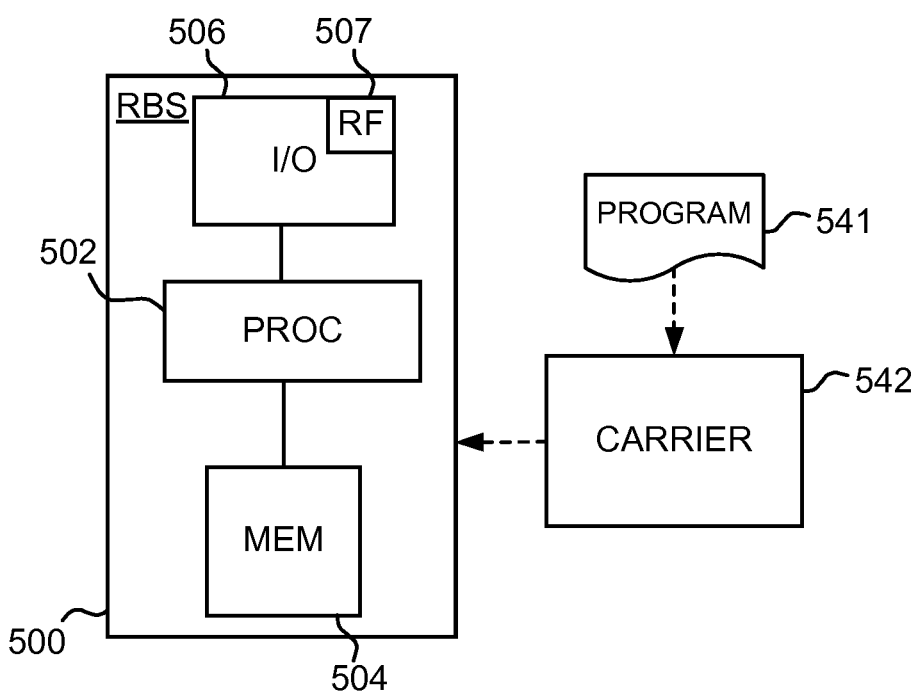
FIG. 5 is a schematic block diagram of a RBS.

FIG. 5 illustrates a RBS 500 which may be the NodeB 104 as described above in connection with FIG. 1. The RBS 500 comprises input/output circuitry 506, part of which is in the form of radio circuitry 507, a processor 502 and memory 504. The memory 504 contains instructions executable by the processor 502 whereby the RBS 500 is operative to configure at least one radio bearer between the RBS 500 and wireless communication devices (such as the UE 106 in FIG. 1) by:
  receiving, from a radio network controller, RNC, radio bearer configuration information, said radio bearer configuration information comprising information for controlling a distribution between a first number of wireless communication devices and a second number of wireless communication devices, said first number of wireless communication devices operating a radio bearer using a first TTI, and said second number of wireless communication devices operating a radio bearer using a second TTI, and
  controlling, using the received radio bearer configuration information, switching of the wireless communication devices from operating using the first transmission time interval, TTI, to operating using the second TTI.

The instructions that are executable by the processor 502 may be software in the form of a computer program 541. The computer program 541 may be contained in or by a carrier 542, which may provide the computer program 541 to the memory 504 and processor 502. The carrier 542 may be in any suitable form including an electronic signal, an optical signal, a radio signal or a computer readable storage medium.

In some embodiments the first number of wireless communication devices and said second number of wireless communication devices are respective maximum numbers.

In some embodiments the RBS 500 is operative to configure the radio bearers by: performing one decision or both decisions of:
  deciding that a wireless communication device using the first TTI in a radio bearer is to be switched to using the second TTI,
  deciding that a wireless communication device using the second TTI in a radio bearer is to be switched to using the first TTI,
wherein the method also comprises:
  if the decision is made that the wireless communication device using the first TTI in a radio bearer is to be switched to using the second TTI, sending, to the RNC, information that the wireless communication device using the first TTI in a radio bearer is to be switched to using the second TTI,
  if the decision is made that the wireless communication device using the second TTI in a radio bearer is to be switched to using the first TTI, sending, to the RNC, information that the wireless communication device using the second TTI in a radio bearer is to be switched to using the first TTI.

In some embodiments the RBS 500 is operative to configure the radio bearers by:
  analysing a status of radio bearers, said status being in terms of TTI switch triggers received from wireless communication devices,
wherein the method further comprises
  determining, based on said analysis of the status of radio bearers, information for updating the radio bearer configuration information,
  sending, to the RNC, the determined information for updating the radio bearer configuration information.

In some embodiments, the determined information for updating the radio bearer configuration information comprises values representing maximum numbers of wireless communication devices operating a radio bearer using the first and the second TTI.

In some embodiments the RBS 500 is operative to configure the radio bearers by:
  sending, to the RNC, information regarding any of:
    information that the first TTI is used in a radio bearer,
    information that the second TTI is used in a radio bearer.

In some embodiments the RBS 500 is operative to configure the radio bearers by:
  exchanging, with the RNC, information regarding the number of wireless communication devices operating a radio bearer using the first TTI and the second TTI, respectively.

In some embodiments, the reception of the radio bearer configuration information comprises any of:
- receiving at least one NodeB application part, NBAP, message,
- receiving at least one Iub/Iur frame protocol message,
- receiving at least one control plane message.

In some embodiments, the first TTI is 2 milliseconds and the second TTI is 10 milliseconds.

Figure 6:
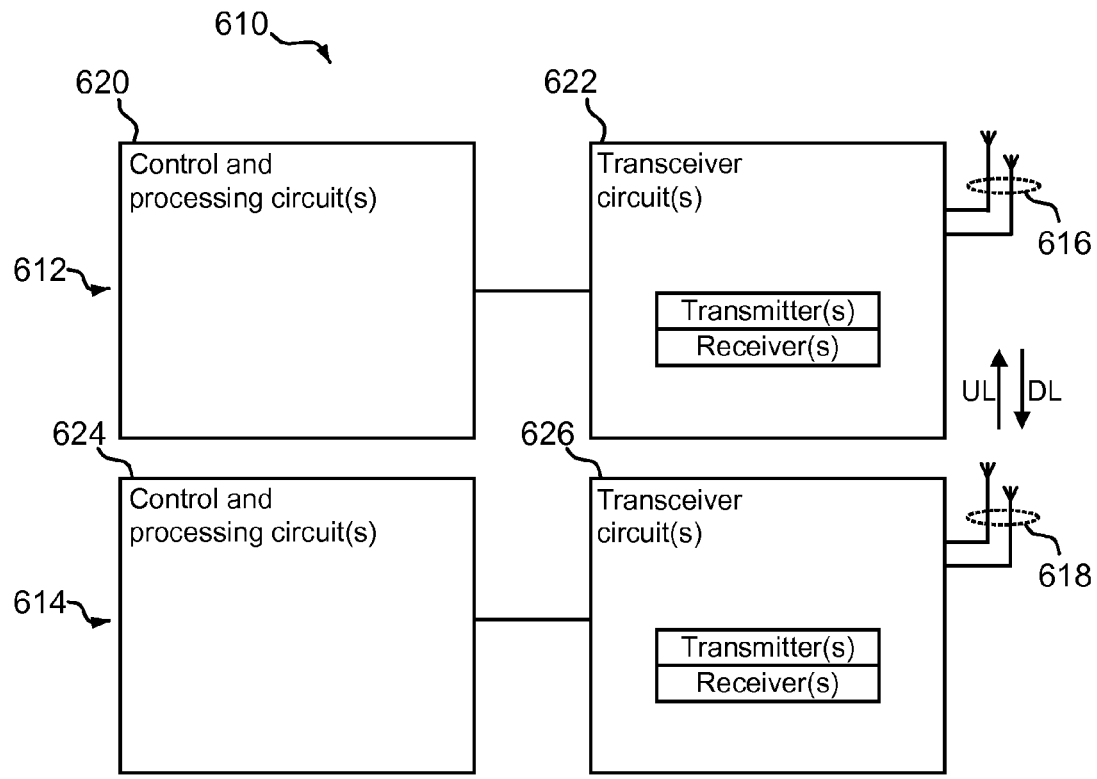
FIG. 6 is a schematic block diagram of a wireless communication system.

FIG. 6 illustrates a system 610 comprising a NodeB 612 and a UE 614. The NodeB 612 comprises a control and processing circuit 620 that are similar in functionality to the processor 502 and memory 504 of the RBS 500 illustrated in FIG. 5. The control and processing circuit 620 is connected to a transceiver circuit 622 that comprises one or more transmitter and one or more receiver, to which an antenna 616 is attached. Similarly, the UE 614 comprises a control and processing circuit 624. The control and processing circuit 624 is connected to a transceiver circuit 626 that comprises one or more transmitter and one or more receiver, to which an antenna 618 is attached. The UE 614 and the NodeB 612 may communicate via an uplink UL and a downlink DL, for example as discussed above in connection with FIGS. 1 to 3.

Figure 7:
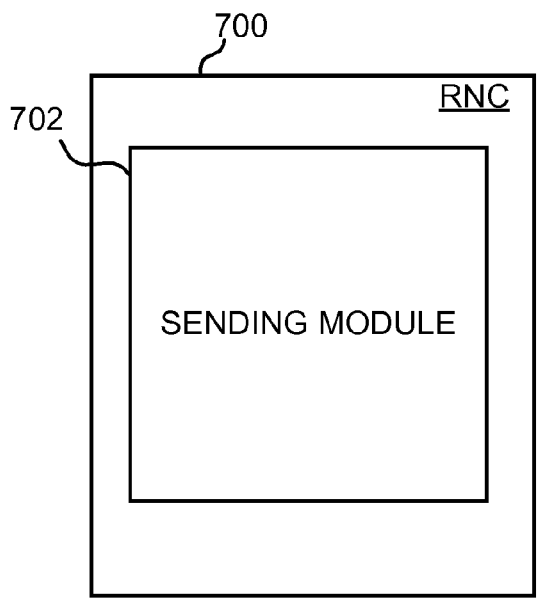
FIG. 7 is a schematic block diagram of a RNC.

FIG. 7 illustrates a RNC 700 that comprises a sending module 702. The sending module 702 is configured to send, from the RNC 700 to a RBS, radio bearer configuration information for controlling a distribution between a first number of wireless communication devices and a second number of wireless communication devices, said first number of wireless communication devices operating a radio bearer using a first TTI, and said second number of wireless communication devices operating a radio bearer using a second TTI. The RNC 700 may comprise further modules that are configured to perform in a similar manner as, e.g., the RNC 400 described above in connection with FIG. 4.

Figure 8:
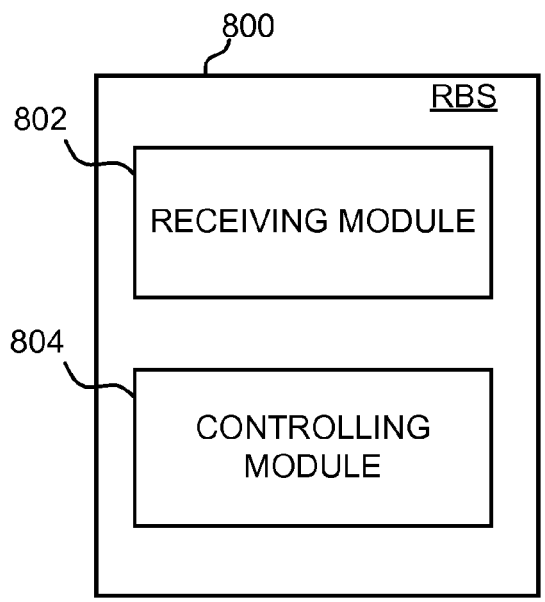
FIG. 8 is a schematic block diagram of a RBS.

FIG. 8 illustrates a RBS 800 that comprises a receiving module 802 and a controlling module 804. The receiving module 802 is configured to receive, from a RNC, radio bearer configuration information, said radio bearer configuration information comprising information for controlling a distribution between a first number of wireless communication devices and a second number of wireless communication devices, said first number of wireless communication devices operating a radio bearer using a first TTI, and said second number of wireless communication devices operating a radio bearer using a second TTI. The controlling module 804 is configured to control, using the received radio bearer configuration information, switching of the wireless communication devices from operating using the first transmission time interval, TTI, to operating using the second TTI. The RBS 800 may comprise further modules that are configured to perform in a similar manner as, e.g., the RBS 500 described above in connection with FIG. 5.

As used herein, the term "processing module" may refer to a processing circuit, a processing unit, a processor, an Application Specific integrated Circuit (ASIC), a Field-Programmable Gate Array (FPGA) or the like. As an example, a processor, an ASIC, an FPGA or the like may comprise one or more processor kernels. In some examples, the processing module may be embodied by a software module or hardware module. Any such module may be a determining means, estimating means, capturing means, associating means, comparing means, identification means, selecting means, receiving means, transmitting means or the like as disclosed herein. As an example, the expression "means" may be a module, such as a determining module, selecting module, etc.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a MemoryStick, a Multimedia Card (MMC), etc.

As used herein, the term "computer readable code units" may be text of a computer program, parts of or an entire binary file representing a computer program in a compiled format or anything there between.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

TABLE 1

| IE/Group Name | Presence | Range | IE Type and Reference | Semantics Description | Criticality | Assigned Criticality |
|---|---|---|---|---|---|---|
| Message Discriminator | M | | 9.2.1.45 | | — | |
| Message Type | M | | 9.2.1.46 | | YES | reject |
| Transaction ID | M | | 9.2.1.62 | | — | |
| C-ID | M | | 9.2.1.9 | | YES | reject |
| Configuration Generation ID | M | | 9.2.1.16 | | YES | reject |
| SFN | O | | 9.2.1.53A | | YES | reject |
| HS-PDSCH, HS-SCCH, E-AGCH, E-RGCH and E-HICH Total Power | O | | Maximum Transmission Power 9.2.1.40 | Maximum transmission power to be allowed for HS-PDSCH, HS-SCCH, E- | YES | reject |

TABLE 1-continued

| IE/Group Name | Presence | Range | IE Type and Reference | Semantics Description | Criticality | Assigned Criticality |
|---|---|---|---|---|---|---|
| HS-PDSCH And HS-SCCH Scrambling Code | O | | DL Scrambling Code 9.2.2.13 | AGCH, E-RGCH and E-HICH codes Scrambling code on which HS-PDSCH and HS-SCCH is transmitted. 0 = Primary scrambling code of the cell 1 . . . 15 = Secondary scrambling code | YES | reject |
| HS-PDSCH FDD Code Information | O | | 9.2.2.18F | | YES | reject |
| HS-SCCH FDD Code Information | O | | 9.2.2.18G | | YES | reject |
| E-AGCH And E-RGCH/E-HICH FDD Scrambling Code | O | | DL Scrambling Code 9.2.2.13 | Scrambling code on which E-AGCH, E-RGCH and E-HICH are transmitted. 0 = Primary scrambling code of the cell 1 . . . 15 = Secondary scrambling code | YES | reject |
| E-AGCH FDD Code Information | O | | 9.2.2.13Ib | | YES | reject |
| E-RGCH/E-HICH FDD Code Information | O | | 9.2.2.13Ia | | YES | reject |
| HSDPA And E-DCH Cell Portion Information | | 0 . . . <maxNrOfCellPortionsPerCell> | | | GLOBAL | reject |
| >Cell Portion ID | M | | 9.2.2.1Ca | | — | |
| >HS-PDSCH And HS-SCCH Scrambling Code | O | | DL Scrambling Code 9.2.2.13 | Scrambling code on which HS-PDSCH and HS-SCCH is transmitted over cell portion. | — | |
| >HS-PDSCH FDD Code Information | O | | 9.2.2.18F | | — | |
| >HS-SCCH FDD Code Information | O | | 9.2.2.18G | | — | |
| >HS-PDSCH, HS-SCCH, E-AGCH, E-RGCH and E-HICH Total Power | O | | Maximum Transmission Power 9.2.1.40 | Maximum transmission power to be allowed for HS-PDSCH, HS-SCCH and E-AGCH, E-RGCH and E-HICH codes over cell portion | — | |
| >E-AGCH And E-RGCH/E-HICH FDD Scrambling Code | O | | DL Scrambling Code 9.2.2.13 | Scrambling code on which E-AGCH, E-RGCH and E-HICH are transmitted over cell portion. | — | |

TABLE 1-continued

| IE/Group Name | Presence | Range | IE Type and Reference | Semantics Description | Criticality | Assigned Criticality |
|---|---|---|---|---|---|---|
| >E-AGCH FDD Code Information | O | | 9.2.2.13Ib | | — | |
| >E-RGCH/E-HICH FDD Code Information | O | | 9.2.2.13Ia | | — | |
| >Maximum Target Received Total Wide Band Power | O | | 9.2.2.21a | | YES | ignore |
| >Reference Received Total Wide Band Power | O | | 9.2.2.39B | | YES | ignore |
| Maximum Target Received Total Wide Band Power | O | | 9.2.2.21a | | YES | reject |
| Reference Received Total Wide Band Power | O | | 9.2.2.39B | | YES | ignore |
| Target Non-serving E-DCH to Total E-DCH Power ratio | O | | 9.2.2.21b | | YES | reject |
| HS-DSCH Common System Information | O | | 9.2.2.75 | | YES | reject |
| Common MAC Flows to Delete | O | | 9.2.2.97 | | YES | reject |
| HS-DSCH Paging System Information | O | | 9.2.2.76 | | YES | reject |
| Paging MAC Flows to Delete | O | | 9.2.2.98 | | YES | reject |
| Common E-DCH System Information | O | | 9.2.2.103 | For Cell FACH and Idle | YES | Reject |
| Common UL MAC Flows to Delete | O | | Common MAC Flows to Delete 9.2.2.97 | | YES | Reject |
| Common E-DCH MAC-d Flows to Delete | O | | E-DCH MAC Flows to Delete 9.2.1.73 | | YES | Reject |
| Enhanced UE DRX Information | O | | 9.2.2.108 | | YES | reject |
| Further Enhanced UE DRX Information | O | | 9.2.2.185 | | YES | ignore |
| Common E-RGCH Operation Indicator | O | | ENUMERATED (true) | | YES | ignore |
| TTI Switching Configuration | | 0 . . . 1 | | | YES | ignore |
| >Maximum number of 2 ms TTI users | M | 0 . . . MaxNum1 | | | — | |
| >Maximum number of 10 ms TTI users | M | 0 . . . MaxNum2 | | | — | |
| >Maximum number of total allowed 10 ms TTI users | O | 0 . . . MaxNum3 | | | — | |

Abbreviations

In the above and in the drawings, effort has been made to explain the abbreviations used. However, any remaining abbreviations find their explanation in the following table:
CFN Connection frame number
C-ID Cell-ID
CRC Cyclic redundancy check
DDI Data description indicator
DRX Discontinuous reception
E-AGHC E-DCH absolute grant channel
E-DCH Enhanced Dedicated Channel
E-HICH E-DCH hybrid ARQ indicator channel
E-RGHC E-DCH relative grant channel
FACH Forward Access Channel
FDD Frequency Division Duplexing
FSN Frame sequence number
FT Frame type
HSDPA High speed downlink packet access
HS-DSCH High speed downlink shared channel
HS-PDSCH High speed physical downlink shared channel
HS-SCCH High speed shared control channel
MAC Medium Access Control Protocol
PDU Protocol Data Unit
RB Radio bearer
SFN System frame number

The invention claimed is:

1. A method performed by a radio base station operating in a wireless communication network, comprising:
receiving a transmission time interval (TTI) switch trigger from a wireless communication device that is connected to the radio base station, the switch trigger requesting that the wireless communication device be switched from a first TTI configuration to a second TTI configuration, the first TTI configuration defined by TTIs of a first length, and the second TTI configuration defined by TTIs of a second length, different than the first length; and in response to the TTI switch trigger, controlling whether the wireless communication device is switched to the second TTI configuration, based on a radio bearer configuration indicating maximum numbers of wireless communication devices that can be configured with the first and second TTI configurations, respectively.

2. The method of claim 1, further comprising, in response to deciding to switch the wireless communication device to the second TTI configuration, sending information to a radio network controller (RNC), indicating that the wireless communication device is to be switched to the second TTI configuration.

3. The method of claim 1, further comprising, in response to deciding to switch the wireless communication device to the second TTI configuration, sending a high-speed shared control channel (HS-SCCH) order to the wireless communication device, ordering the switch.

4. The method of claim 1, further comprising receiving the radio bearer configuration information from a radio network controller (RNC) associated with the radio base station.

5. The method of claim 4, further comprising:
analyzing a status of radio bearers that reflects TTI switch triggers received from wireless communication devices connected to the radio base station;
determining from said analyzing that the maximum numbers of wireless communication devices that can be configured with the first and second TTI configurations should be adjusted; and
sending an adjustment recommendation to the RNC.

6. The method of claim 5, wherein the adjustment recommendation comprises at least one of a recommended new maximum number of wireless devices that can use the first TTI configuration while being served by the radio base station, and a recommended new maximum number of wireless devices that can use the second TTI configuration while being served by the radio base station.

7. The method of claim 6, further comprising determining at least one of the recommended new maximum numbers based on receiving a threshold number of TTI switch triggers from wireless communication devices being served by the radio base station.

8. The method of claim 1, wherein the first TTI configuration comprises a TTI length of 2 milliseconds, and wherein the second TTI configuration comprises a TTI length of 10 milliseconds.

9. A radio base station configured to operate in a wireless communication network, the radio base station comprising:
a transceiver circuit configured to receive a transmission time interval (TTI) switch trigger from a wireless communication device that is connected to the radio base station, the switch trigger requesting that the wireless communication device be switched from a first TTI configuration to a second TTI configuration, the first TTI configuration defined by TTIs of a first length, and the second TTI configuration defined by TTIs of a second length, different than the first length; and
a processing circuit configured to, in response to the TTI switch trigger, control whether the wireless communication device is switched to the second TTI configuration, based on a radio bearer configuration indicating maximum numbers of wireless communication devices that can be configured with the first and second TTI configurations, respectively.

10. The radio base station of claim 9, wherein the control and processing circuit is configured to, in response to deciding to switch the wireless communication device to the second TTI configuration, send information to a radio network controller (RNC), indicating that the wireless communication device is to be switched to the second TTI configuration.

11. The radio base station of claim 9, wherein the control and processing circuit is configured to, in response to deciding to switch the wireless communication device to the second TTI configuration, send a high-speed shared control channel (HS-SCCH) order to the wireless communication device, ordering the switch.

12. The radio base station of claim 9, wherein the transceiver circuit is configured to receive the radio bearer configuration information from a radio network controller (RNC) associated with the radio base station.

13. The radio base station of claim 12, wherein the control and processing circuit is configured to:
analyze a status of radio bearers that reflects TTI switch triggers received from wireless communication devices connected to the radio base station;
determine from said analyzing that the maximum numbers of wireless communication devices that can be configured with the first and second TTI configurations should be adjusted; and
send an adjustment recommendation to the RNC.

14. The radio base station of claim 13, wherein the adjustment recommendation comprises at least one of a recommended new maximum number of wireless devices that can use the first TTI configuration while being served by the radio base station, and a recommended new maximum number of wireless devices that can use the second TTI configuration while being served by the radio base station.

15. The radio base station of claim 14, wherein the control and processing circuit is configured to determine at least one of the recommended new maximum numbers based on receiving a threshold number of TTI switch triggers from wireless communication devices being served by the radio base station.

16. The radio base station of claim 9, wherein the first TTI configuration comprises a TTI length of 2 milliseconds, and wherein the second TTI configuration comprises a TTI length of 10 milliseconds.

17. A non-transitory computer-readable storage medium storing a computer program comprising program instructions that, when executed on at least one processor of a radio base station, cause the radio base station to:
receive a transmission time interval (TTI) switch trigger from a wireless communication device that is connected to the radio base station, the switch trigger requesting that the wireless communication device be switched from a first TTI configuration to a second TTI configuration, the first TTI configuration defined by TTIs of a first length, and the second TTI configuration defined by TTIs of a second length, different than the first length; and
in response to the TTI switch trigger, control whether the wireless communication device is switched to the second TTI configuration, based on a radio bearer configuration indicating maximum numbers of wireless communication devices that can be configured with the first and second TTI configurations, respectively.

* * * * *

UNITED STATES PATENT AND TRADEMARK OFFICE
CERTIFICATE OF CORRECTION

PATENT NO. : 9,591,618 B2
APPLICATION NO. : 14/382254
DATED : March 7, 2017
INVENTOR(S) : Shi et al.

Page 1 of 1

It is certified that error appears in the above-identified patent and that said Letters Patent is hereby corrected as shown below:

In the Drawings

In Fig. 1, Sheet 1 of 5, delete "  " and insert -- 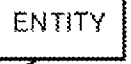 --, therefor.

In Fig. 5, Sheet 4 of 5, for Tag "507", delete "RF" and insert -- RC --, therefor.

In the Specification

In Column 5, Line 61, delete "RL's" and insert -- RLs --, therefor.

In Column 10, Line 45, delete "comprises" and insert -- comprises: --, therefor.

In Column 15, Line 58, delete "E-AGHC" and insert -- E-AGCH --, therefor.

In Column 15, Line 61, delete "E-RGHC" and insert -- E-RGCH --, therefor.

In Column 16, Line 51, delete "Control Protocol" and insert -- Control --, therefor.

Signed and Sealed this
Seventh Day of November, 2017

Joseph Matal
*Performing the Functions and Duties of the
Under Secretary of Commerce for Intellectual Property and
Director of the United States Patent and Trademark Office*